United States Patent
Wardrop et al.

(10) Patent No.: US 7,132,185 B2
(45) Date of Patent: Nov. 7, 2006

(54) FUEL CELL SYSTEM SHUNT REGULATOR METHOD AND APPARATUS

(75) Inventors: David S. Wardrop, Vancouver (CA); Michael Sexsmith, North Vancouver (CA); Russell H. Barton, New Westminster (CA)

(73) Assignee: Ballard Power Systems Inc., Burnaby (CA)

( * ) Notice: Subject to any disclaimer, the term of this patent is extended or adjusted under 35 U.S.C. 154(b) by 711 days.

(21) Appl. No.: 10/017,483

(22) Filed: Dec. 14, 2001

(65) Prior Publication Data

US 2003/0113600 A1   Jun. 19, 2003

(51) Int. Cl.
*H01M 8/04* (2006.01)
(52) U.S. Cl. .............................. 429/22; 429/23; 429/30
(58) Field of Classification Search .................. 429/22, 429/23, 26, 12
See application file for complete search history.

(56) References Cited

U.S. PATENT DOCUMENTS

| | | | |
|---|---|---|---|
| 3,322,972 A | 5/1967 | Csanky | 307/88.5 |
| 3,535,613 A | 10/1970 | Katzenstein | 323/8 |
| 3,638,049 A | 1/1972 | Bom | 307/310 |
| 3,850,695 A * | 11/1974 | Keller et al. | 429/23 |
| 5,023,150 A | 6/1991 | Takabayashi | 429/22 |
| 5,105,142 A | 4/1992 | Takabayashi | 320/3 |
| 5,156,928 A | 10/1992 | Takabayashi | 429/23 |
| 5,175,676 A | 12/1992 | Kikuchi | 363/58 |
| 5,410,441 A | 4/1995 | Allman | 361/18 |
| 5,713,426 A | 2/1998 | Okamura | 180/65.3 |
| 6,025,083 A | 2/2000 | Veyo et al. | 429/13 |
| 6,432,569 B1 | 8/2002 | Zeilinger et al. | 429/23 |

FOREIGN PATENT DOCUMENTS

| | | |
|---|---|---|
| EP | 0 982 788 A2 | 3/2000 |
| JP | 58-012025 | 1/1983 |
| WO | WO 91/19328 | 12/1991 |

* cited by examiner

*Primary Examiner*—Raymond Alejandro
(74) *Attorney, Agent, or Firm*—Seed IP Law Group PLLC

(57) ABSTRACT

A fuel cell system for powering a work load includes a fuel cell stack and a shunt regulator having a threshold detection; transistorized power switching element, and a dump load. The threshold detection element identifies when an abnormally high voltage rises. The power switching element routes power from the high voltage buss to the dump load. The dump load acts as an electrical energy sink, and may provide dissipated energy to the fuel cell stack in the form of heat. The switching element can also shunt power to the dump load when a digital control signal is set, for example at startup or during cold start conditions.

9 Claims, 6 Drawing Sheets ns. Damage modes include blown fuses, contactor arcing
and overheated components. It is thus typical to have a

FUEL CELL SYSTEM SHUNT REGULATOR METHOD AND APPARATUS

BACKGROUND OF THE INVENTION

1. Field of the Invention

This invention is generally related to fuel cell systems, and more particularly to controlling the open circuit voltage of a fuel cell stack.

2. Description of the Related Art

Electrochemical fuel cells convert fuel and oxygen to electricity. Solid polymer electrochemical fuel cells generally employ a membrane electrode assembly ("MEA") which includes an ion exchange membrane or solid polymer electrolyte disposed between two electrodes typically comprising a layer of porous, electrically conductive sheet material, such as carbon fiber paper or carbon cloth. The MEA contains a layer of catalyst, such as a finely comminuted platinum, at each membrane electrode interface to induce the desired electrochemical reaction. In operation, the electrodes are electrically coupled to conduct electrons through an external circuit. Typically, a number of MEAs are electrically coupled in series to form a fuel cell stack having a desired nominal power output to power a load.

Fuel cell stacks are often sized to meet a variety of different voltage and current constraints imposed by the variety of work loads, the size and shape of the fuel cell and the number of fuel cells. While it is possible to scale a specific fuel cell system design for each application, it is not always commercially economical. It is often desirable to connect fuel cell stacks to loads which require different voltage ranges than those naturally provided by the fuel cell stack. Since the voltage of the stack is a function of the current it varies from its zero current voltage (open circuit voltage or OCV) to its peak load voltage. This range of voltages may cause three problems in matching the needs of the loads.

First, since efficiency requirements make it desirable to match the fuel cell voltage with the load voltage at the nominal operating load, the zero current voltage may exceed the allowable range in voltage of the work load circuit (note, all electrical components have a maximum rated voltage). The work load should be protected from exposure to an overvoltage.

Second, in some applications, fuel cells are electrically connected to other energy sources such as power grids, battery systems or electrical generators (such as in a vehicular application with regenerative braking systems). In these applications, it is possible (usually under fault conditions) for these other energy sources to raise the voltage across the fuel cell stack terminal higher than the maximum allowable fuel cell stack voltage. If this stack voltage is exceeded, the fuel cell stack could be damaged by several types of failure including insulation breakdown, electrochemical corrosion or reverse reaction. Thus, the fuel cell stack should be protected from this voltage condition. While a series diode may block any currents flowing into the stack thus preventing damage, a series diode results in a constant parasitic waste of power.

Third, in typical applications, fuel cell stacks are separated from the rest of the load circuit by a switch or set of switches. When these switches are closed there is typically an in-rush of electrical current into the load circuit to charge up its inherent capacitance. The inrush current can be very large and can damage several types of electrical components. Damage modes include blown fuses, contactor arcing and overheated components. It is thus typical to have a voltage matching circuit that either raises the voltage on the load side of the circuit or lowers the voltage on the supply (i.e., fuel cell stack) side of the switch.

BRIEF SUMMARY OF THE INVENTION

A shunt regulator can reduce the voltage across the stack terminals to protect the work load component from being exposed to an overvoltage by detecting the high voltage and sinking current into the dump resistor, thus lowering the voltage at the stack terminal. A shunt regulator can also route energy form other energy sources away for the fuel cell stack to protect the fuel cell stack from an excessive voltage condition by detecting the threshold voltage and then dumping the excess energy through the dump resistor, avoiding the constant parasitic waste of power. A shunt regulator can further be used to lower the stack voltage to the desired level, for example when switching the load onto the fuel cell stack. Thus, a shunt regulator with an appropriate threshold voltage and a digital override circuit could solve the above recited problems. A single circuit could thus be used, dramatically reducing cost and volume while increasing the reliability of the fuel cell system since there are fewer parts to fail.

In one aspect, a fuel cell stack assembly includes: a first set of fuel cells, a first threshold detector responsive to an stack terminal voltage across the first set of fuel cells, a first transistor coupled for activation via the first threshold detector, and a first dump load wherein the first transistor is responsive to the stack terminal voltage across the first set of fuel cells to selectively couple the first dump load in parallel with the first set of fuel cells when the stack terminal voltage across the first set of fuel cells exceeds a threshold voltage and to uncouple the first dump load when the stack terminal voltage is below the threshold voltage. The fuel cell stack assembly may also include a second set of fuel cells, a second threshold detector responsive to an stack terminal voltage across the second set of fuel cells, a second transistor coupled for activation via the second threshold detector, and a second dump load, wherein the second transistor is responsive to the stack terminal voltage across the second set of fuel cells to selectively couple the second dump load in parallel with the second set of fuel cells when the stack terminal voltage exceeds a threshold voltage and to uncouple the second dump load when the stack terminal voltage is below the threshold voltage. The dump load may be positioned proximate the fuel cells and/or upstream from the fuel cells to supply heat to the fuel cell stack. A capacitance may be electrically coupled across the dump load and/or an inductance may be electrically coupled in series between the fuel cells and the dump load.

In another aspect, a shunt regulator includes: a transistor responsive to a fuel cell stack terminal voltage on the high voltage bus and a dump load selectively coupleable to the high voltage bus in parallel with the fuel cell stack by the transistor while the fuel cell stack terminal voltage exceeds a threshold voltage.

In a further aspect, a method of operating a fuel cell stack includes: determining a voltage across at least a portion of a fuel cell stack, determining whether the determined voltage exceeds a threshold voltage, and selectively operating a transistorized switch to place a dump load across the fuel cell stack when the determined voltage across at least a portion of the fuel cell stack exceeds the threshold voltage.

In yet a further aspect, a method of operating a fuel cell stack includes: determining a voltage across a power bus of a fuel cell stack, determining whether the determined voltage exceeds a threshold voltage, and selectively operating a transistorized switch to place a dump load across the power bus of the fuel cell stack while the determined voltage exceeds the threshold voltage.

BRIEF DESCRIPTION OF THE SEVERAL VIEWS OF THE DRAWING(S)

In the drawings, identical reference numbers identify similar elements or acts. Sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of the various embodiments of the invention. However, one skilled in the art will understand that the invention may be practiced without these details. In other instances, well-known structures associated with fuel cells, fuel cell stacks and fuel cell systems have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Figure 1:
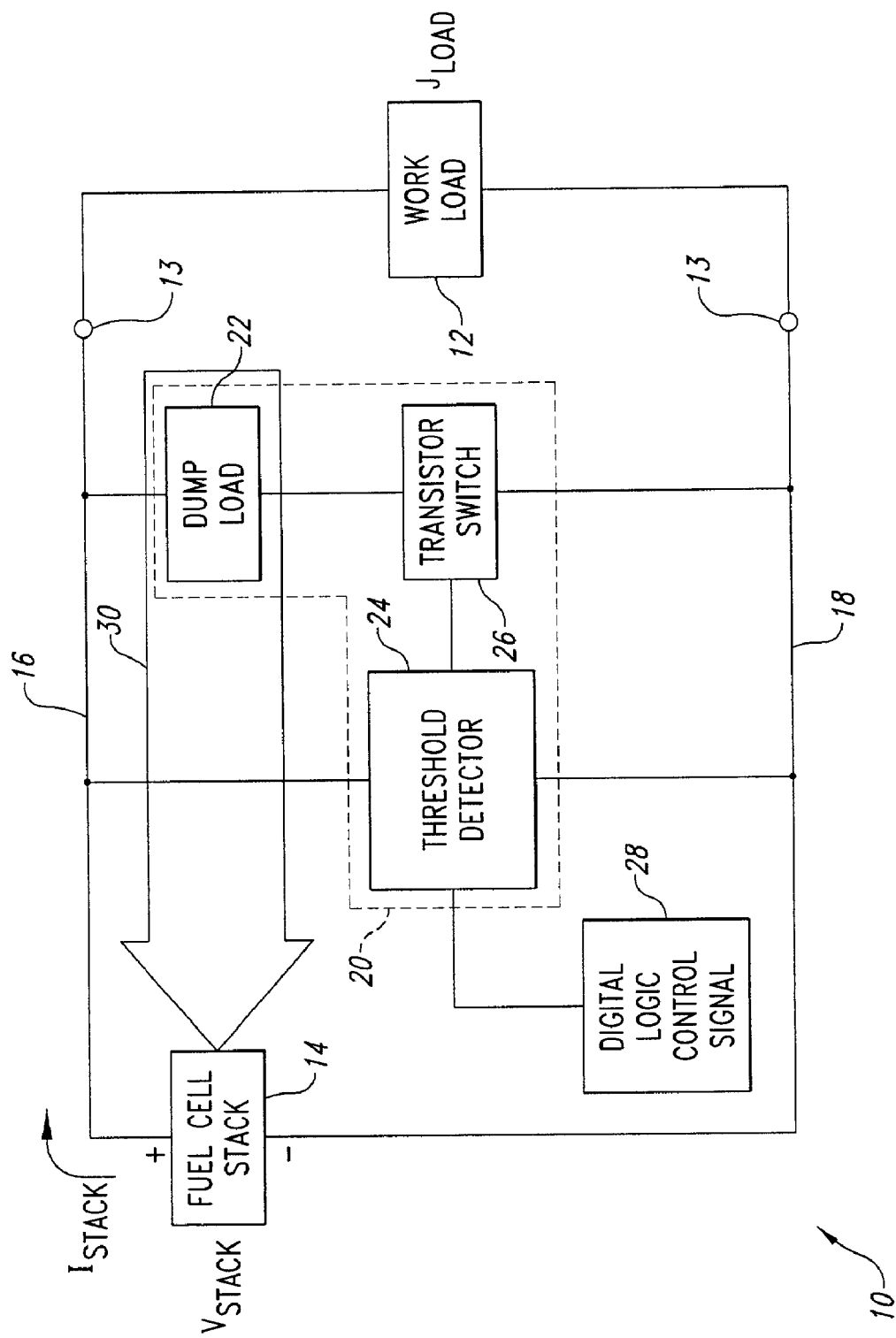
FIG. 1 is a schematic diagram of a fuel cell system providing power to a work load, the fuel cell system including a fuel cell stack and a shunt regulator having a threshold detector, a dump load and a transistorized switch.

FIG. 1 shows a fuel cell system 10 providing power to a work load 12 according to an illustrated embodiment of the invention. The work load 12 typically constitutes the device to be powered by the fuel cell system 10, such as a vehicle, appliance, computer and/or associated peripherals. An impedance and conductance $J_{LOAD}$ is associated with the work load 12. Although the fuel cell system 10 is not typically considered part of the work load 12, in some embodiments portions of the fuel cell system 10 such as the control electronics may constitute a portion or all of the work load 12. The work load 12 is electrically coupled to the fuel cell system 10 via a contactor 13, which typically permits the selective electrical coupling and decoupling of the work load 12 to the fuel cell system 10.

The fuel cell system 10 includes a fuel cell stack 14 composed of a number of individual fuel cells electrically coupled in series. The fuel cell stack 14 receives reactants such as hydrogen and air from a reactant supply system (not shown). The reactant supply system may include one or more reactant supply reservoirs, a reformer, and/or one or more control elements such as compressors, pumps and/or valves. Operation of the fuel cell stack 14 produces reactant products, such as water. The fuel cell system 10 may reuse some reactant products, for example to humidify the hydrogen, air and/or ion exchange membrane, or to control the stack temperature. The fuel cell stack 14 produces a voltage $V_{STACK}$ across a positive rail 16 and a negative rail 18 of a high voltage bus formed by the rails 16, 18. A stack current $I_{STACK}$ flows to the work load 12 from the fuel cell stack 14. As used herein, high voltage refers to the voltage produced by conventional fuel cell stacks 14 to power work loads, and is used to distinguish between other voltages employed by fuel cell control system. Thus, high voltage is not necessarily "high" with respect to other electrical systems.

The fuel cell system 10 includes a shunt regulating circuit (identified by broken line box 20) for dissipating power when the stack voltage $V_{STACK}$ exceeds a threshold voltage $V_T$. The shunt regulating circuit 20 includes a dump load 22, a threshold detector 24 and a transistorized switch 26 for electrically coupling and uncoupling the dump load 22 across rails 16, 18 of the high voltage bus in parallel with the fuel cell stack 14. The shunt regulating circuit 20 may electrically couple to the rails 16, 18 on the fuel cell stack 14 side of the contactor 13, where the load side requires protection.

The threshold detector 24 is electrically coupled across the rails 16, 18 of the high voltage bus to determine the stack voltage $V_{STACK}$. The threshold detector 24 can also receive a digital logic control signal 28. The threshold detector 24 can be responsive to the digital logic control signal 28 to shunt a portion of the stack current $I_{STACK}$ through the dump load 22 even if the voltage threshold $V_T$ is not exceeded. The digital logic control signal 28 may be supplied by a control system, microprocessor or micro-controller (not shown) associated with the fuel cell system 10. The digital logic control signal 28 may be supplied when a temperature $T_S$ of the fuel cell stack 14 is below optimal and additional heating is required. This digital logic control signal 28 may be supplied just prior to activation (either upon closing or particularly upon opening) the load disconnect contactor 13 to ensure that the voltage on the stack side of the contactor remains within the specification.

The dump load 22 can be located proximate the fuel cell stack 14 to provide heat to the fuel cell stack 14. Additionally or alternatively, the dump load 22 can be positioned upstream in an airflow (illustrated by arrow 30) to cause heat dissipated by the dump load 22 to warm the fuel cell stack 14. A fan or other air circulating mechanism (not shown) can supply the airflow 30. The dump load 22 has different transient (i.e., short term) and continuous energy capacities. The continuous rating of the dump load 22 can be sized to match the amount of energy that must be absorbed to bring the stack voltage $V_{STACK}$ within acceptable OCV tolerances. A dump load 22 having a high transient sinking capability is desirable, but must be balanced against competing concerns such as cost, size, and ability of the fuel cell system 10 to dissipate heat.

Figure 2:
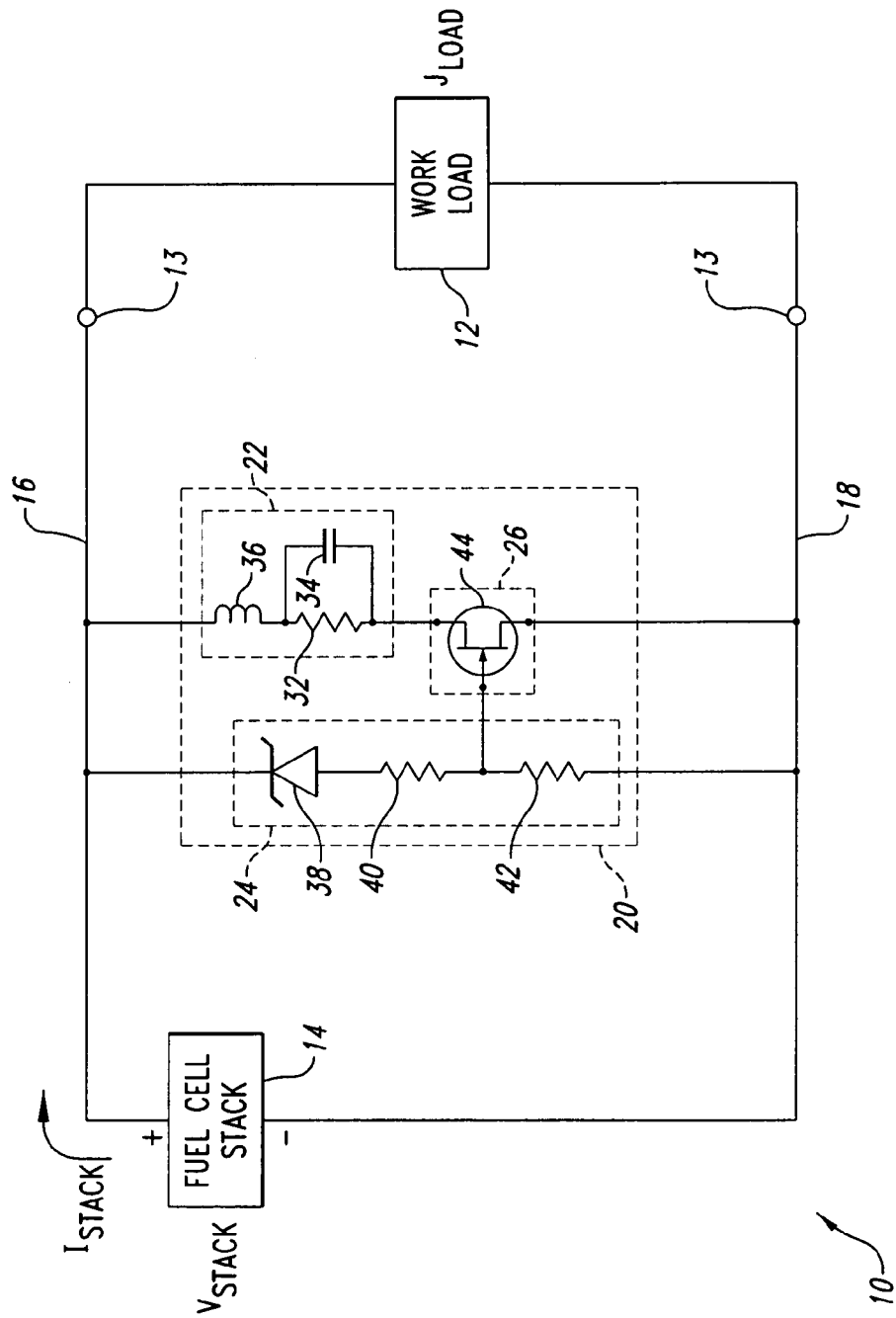
FIG. 2 is an electrical schematic of the fuel cell system of FIG. 1 providing power to the work load, further illustrating one embodiment of the shunt regulator including an N-channel JFET as the transistorized switch.

FIG. 2 shows an embodiment of the shunt regulating circuit 20. The dump load 22 includes a resistive element such as a resistor 32 for thermally dissipating excess power when shunted across the high voltage bus formed by rails 16, 18. The dump load 22 may also include a capacitance, such as a capacitor 34, electrically coupled in parallel with the resistor 32 to lower the dynamic impedance of the dump load 22 and/or improve the transient absorption capability. Additionally, the dump load 22 may include an inductance, such as an inductor 36, electrically coupled in series with the fuel cell stack 14 and the resistor 32, to alter the dynamic impedance a load side transient would see on the path back to the fuel cell stack 14.

The threshold detector 24 can include a Zener diode 38 and a voltage divider composed of a first resistor 40 and second resistor 42 coupled between the positive and negative rails 16, 18, respectively, forming the high voltage bus.

As illustrated in FIG. 2, the transistorized switch 26 may take the form of an n-channel junction field effect transistor ("JFET") 44. The n-channel JFET 44 has a drain coupled to the positive voltage rail 16 through the dump load 22 and a source coupled to the negative voltage rail 18. The n-channel JFET 44 includes a gate electrically coupled to the voltage divider formed by resistors 40, 42. One skilled in the art may favor n-channel transistors which tend to be relatively inexpensive and have good triggering capabilities.

Figure 3:
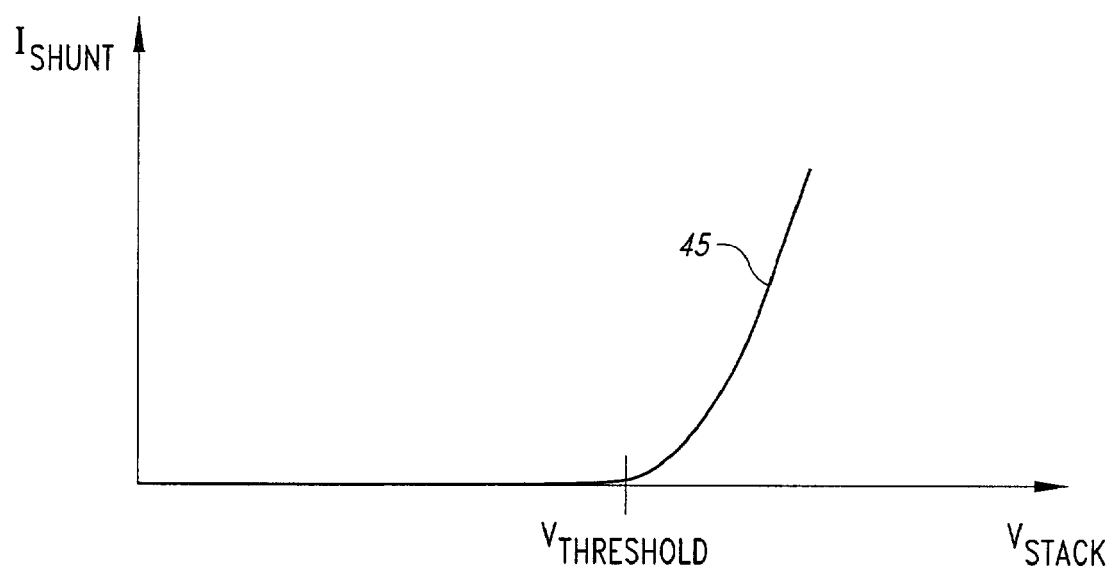
FIG. 3 is a graph showing a relationship of a shunt current through a dump load with respect to a voltage across the fuel cell stack, for the fuel cell system of FIG. 1.

FIG. 3 shows the relationship 45 between current shunted $I_{SHUNT}$ through the dump load 22 and the stack voltage $V_{STACK}$. The shunt current $I_{SHUNT}$ is essentially zero until the voltage threshold $V_T$ is reached, at which point the shunt current $I_{SHUNT}$ rapidly rises. Thus, at high voltage bus voltages less than the voltage threshold $V_T$, the shunt regulating circuit 20 presents essentially no load, while at voltages greater than the threshold voltage $V_T$, the shunt regulating circuit 20 appears as a load and will absorb (i.e., sink) electrical energy and thus lower the high voltage bus voltage.

Figure 4:
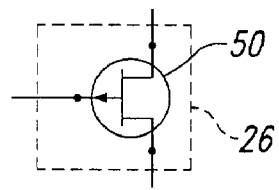
FIG. 4 is an electrical schematic showing a p-channel JFET for use as an alternative transistorized switch in the circuit of FIG. 2.

FIG. 4 shows an alternative embodiment of the transistorized switch 26 in the form of a P-channel JFET 50.

Figure 5:
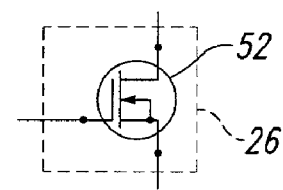
FIG. 5 is an electrical schematic showing an n-channel MOSFET for use as an alternative transistorized switch in the circuit of FIG. 2.

FIG. 5 shows another alternative of the transistorized switch 26 in the form of an n-channel metal oxide semiconductor field effect transistor ("MOSFET") 52.

Figure 6:
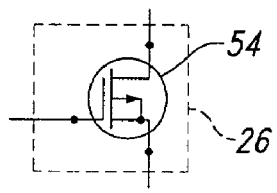
FIG. 6 is an electrical schematic showing a p-channel MOSFET for use as an alternative transistorized switch in the circuit of FIG. 2.

FIG. 6 shows a further alternative of the transistorized switch 26 in the form of a p-channel MOSFET 54.

Figure 7:
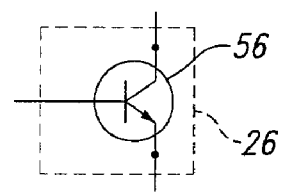
FIG. 7 is an electrical schematic showing a npn bipolar junction transistor for use as an alternative transistorized switch in the circuit of FIG. 2.

FIG. 7 shows a further alternative of the transistorized switch 26 in the form of a npn bipolar junction transistor 56.

Figure 8:
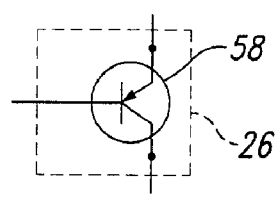
FIG. 8 is an electrical schematic showing a pnp bipolar junction transistor for use as an alternative transistorized switch in the circuit of FIG. 2.

FIG. 8 shows a further alternative of the transistorized switch 26 in the form of a pnp bipolar junction transistor 58.

Figure 9:
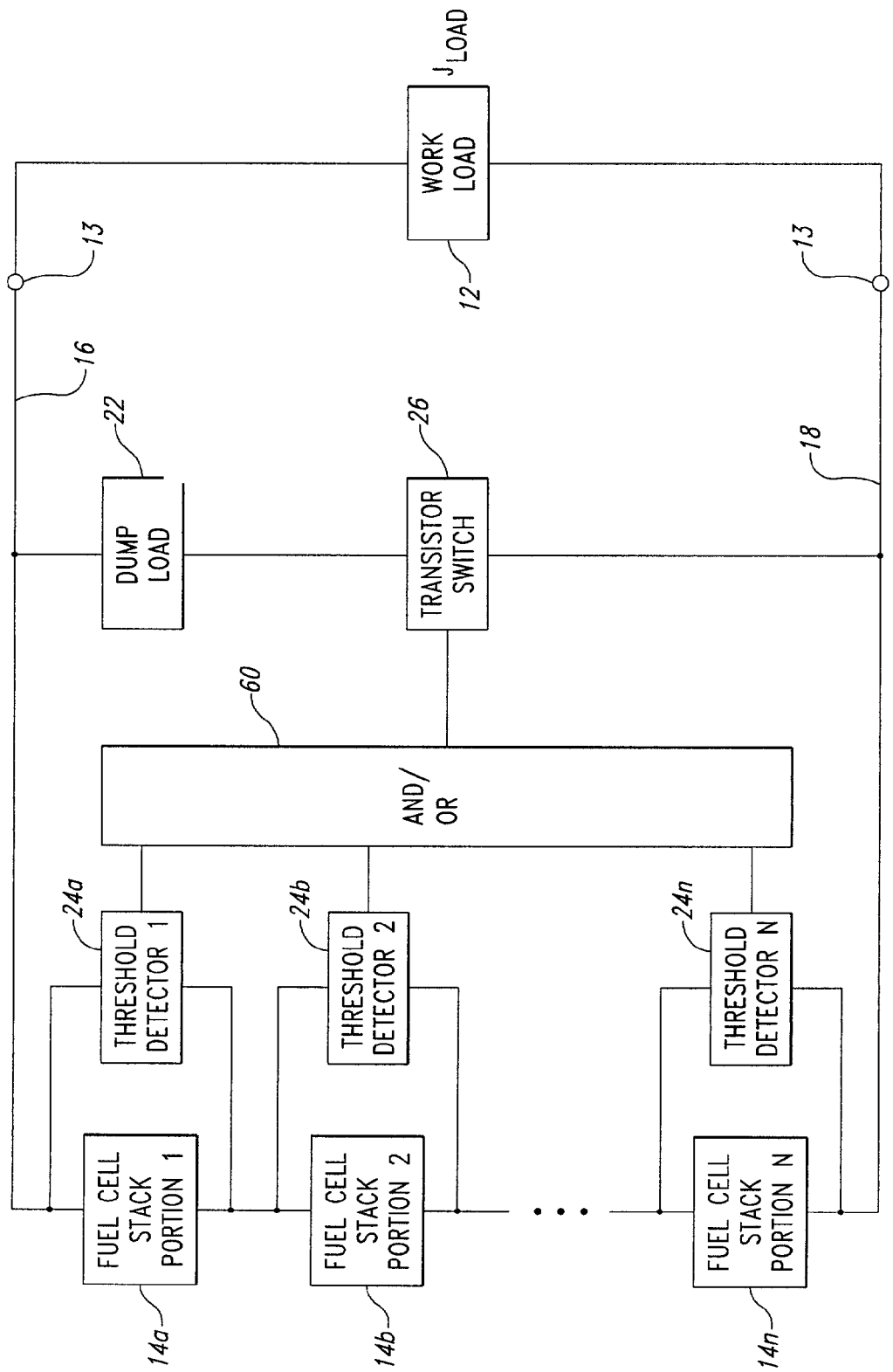
FIG. 9 is a schematic diagram of an alternative embodiment of the fuel cell system powering the work load, employing a number of shunt regulators, each associated with a respective portion of the fuel cell stack.
Figure 10:
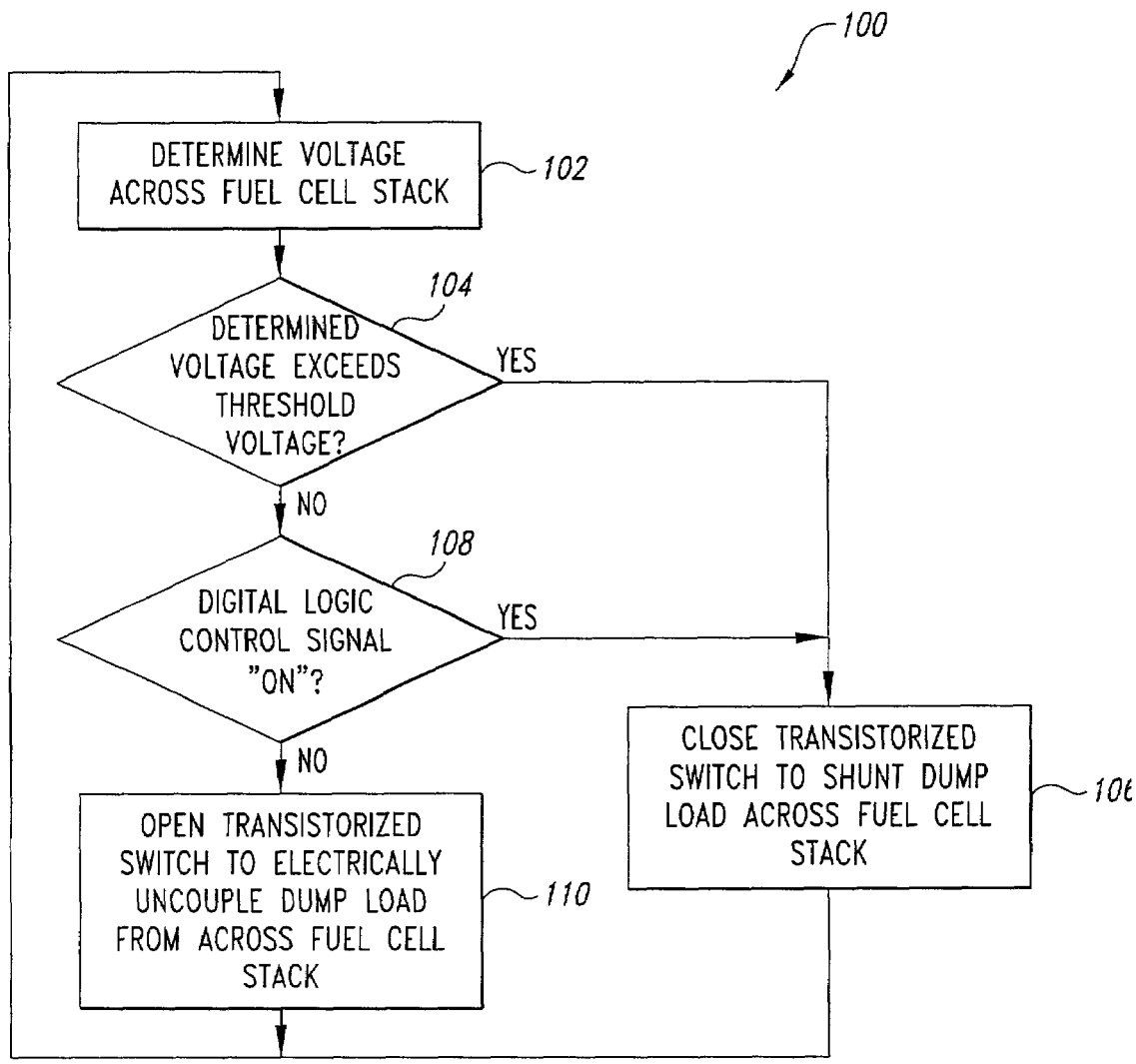
FIG. 10 is a flow diagram showing an exemplary method of operating the fuel cell system of FIGS. 1–9.

FIG. 9 shows an alternative embodiment of the fuel cell system 10, employing individual threshold detectors 24a, 24b–24n, each associated with a respective portion of the fuel cell stack 14a, 14b–14n. The illustrated embodiment employs an AND/OR or nonexclusive OR circuit 60 to couple an excessive voltage condition signal from any of the individual threshold detectors 24a, 24b–24n to the transistorized switch 26 for shunting the dump load 22 across the rails 16, 18 of the high voltage bus. In a further alternative, the embodiment of FIG. 7 can eliminate the OR circuit 60 by employing respective transistorized switches 26 and/or dump loads 22 associated with each of the threshold detectors 24a, 24b–24n.

In typical use, a respective shunt regulating circuit 20 may be located across each individual fuel cell row in the fuel cell stack 14. However, a single shunt regulating circuit 20 could span across an entire module (e.g., one regulating circuit for one or more cell rows), or could be implemented as many shunt regulating circuits 20, each across a respective fuel cell stack grouping with as few as a single cell. One skilled in the art may recognize that employing a respective shunt regulating circuit 20 for each individual cell row provides a good match to commonly available electrical components and to the dump load (i.e., heater) availability at conventional fuel cell system operating levels. The use of four or six shunt regulating circuits 20 (e.g., one per row) in a fuel cell stack system 10 also provides a measure of redundancy.

FIG. 8 shows an exemplary method 100 of operating the fuel cell system 10. In step 102, the fuel cell system 10 determines the voltage $V_{STACK}$ across the fuel cell stack 14. In step 104, the fuel cell system determines whether the determined voltage exceeds the threshold voltage $V_T$. If the determined voltage exceeds the threshold voltage $V_T$, the fuel cell system 10 selectively operates the transistorized switch 26 in step 106, to electrically coupled the dump load 22 across the fuel cell stack 14 while the determined stack voltage $V_{STACK}$ exceeds the threshold voltage $V_T$. If the determined voltage does not exceed the threshold voltage, the fuel cell system determines whether the digital logic control signal 28 is "set" or "ON" in step 108. If the digital logic control signal 28 is not "set" or "ON," the fuel cell system 10 opens the transistorized switch 26 in step 110, to electrically uncouple the dump load 22 from across the fuel cell stack 14. If the digital control logic signal is "set" or "ON," the fuel cell system 10 selectively operates the transistorized switch 26 in step 106, to electrically couple the dump load 22 across the fuel cell stack 14. The method 100 is repeated while the fuel cell system 10 is operating.

Thus, as described above, the shunt regulating circuit 20 may provide transient protection to the fuel cell stack 14, may aid in cold startup conditions, and/or may provide high stack open circuit voltage surge protection to the work load 12, while maintaining good power economy. The shunt regulating circuit 20 may protect both the work load 12 and the fuel cell stack 14, and may provide protection whether the transient condition is stack generated or load generated.

Also as described above, the shunt regulating circuit 20 absorbs only the transient/surge energy from the fuel cell stack 14 or the work load 12. Because of the threshold switching, the shunt regulating circuit 20 will not absorb any of the normal energy and therefore does not pose a constant parasitic power draw.

Additionally, the shunt regulating circuit 20 can dissipate power to serve various requirements of the fuel cell system 10. For example, the shunt regulating circuit 20 can dissipate power (i.e., heat) to coolant in order to assist in cold starts and/or to facilitate work load contactor 13 or closure. As discussed above, a high OCV condition is a common occurrence on cold starts with PEM fuel cells. The shunt regulating circuit 20 operates to place a work load 12 on the fuel cell stack 14 until the stack voltage $V_{STACK}$ drops to an acceptable level. The electrical energy dissipated from the shunt regulating circuit 20 can be converted (i.e., a heater) to heat energy which can then elevate the temperature of stack current and/or stack reactants. The shunt regulating circuit 20 warms the fuel cell stack 14 in two distinct ways, internally by operating the fuel cell stack 14 to source the energy that flows to the shunt regulating circuit 20, and externally, by returning the dissipated energy to the fuel cell stack 14 as heat. Thus, in operation the shunt regulating circuit 20 with a heater dump load 22 may shorten cold start time.

Further, if the active device (i.e., transistorized switch 26) of shunt regulating circuit 20 fails open, the shunt regulating circuit 20 will be disconnected, while if the active device 26 fails closed a permanent parasitic load will be imposed on the fuel cell stack 14. In neither case will the fuel cell stack 14 be disconnected from the work load 12. Thus, the shunt regulating circuit 20 performs better under the fault scenario than a series regulator.

Although specific embodiments of and examples for the fuel cell system and method are described herein for illustrative purposes, various equivalent modifications can be made without departing from the spirit and scope of the invention, as will be recognized by those skilled in the relevant art. For example, the teachings provided herein can be applied to fuel cell systems including other types of fuel cell stacks or fuel cell assemblies, not necessarily the polymer exchange membrane fuel cell assembly generally described above. Additional transient suppression devices can be placed across the stack (i.e., faster devices with higher threshold, lower dynamic impedance and lower power absorption capability) without risk of their failure. The shunt regulating circuit 20 can also include self protection devices, such as fuses or thermal trips. While the drawings all illustrate low side switching, the fuel cell system 10 can employ high side switching as well.

The various embodiments described above can be combined to provide further embodiments. Aspects of the invention can be modified, if necessary, to employ systems, circuits and concepts to provide yet further embodiments of the invention.

These and other changes can be made to the invention in light of the above-detailed description. In general, in the following claims, the terms used should not be construed to limit the invention to the specific embodiments disclosed in the specification and claims, but should be construed to include all fuel cell systems that operate in accordance with the claims. Accordingly, the invention is not limited by the disclosure, but instead its scope is to be determined entirely by the following claims.

What is claimed is:

1. A fuel cell stack assembly for providing power to a working load, comprising:
    a first set of solid polymer electrochemical fuel cells;
    a first threshold detector responsive to a stack terminal voltage across the first set of solid polymer electrochemical fuel cells;
    a first transistor coupled for activation via the first threshold detector; and
    a first dump load, wherein the first transistor is responsive to the stack terminal voltage across the first set of fuel cells to selectively couple the first dump load in parallel with the first set of fuel cells when the stack terminal voltage across the first set of solid polymer electrochemical fuel cells exceeds a threshold voltage and to uncouple the first dump load when the stack terminal voltage across the first set of solid polymer electrochemical fuel cells is below the threshold voltage.

2. The fuel cell stack assembly of claim 1, further comprising:
    a second set of solid polymer electrochemical fuel cells;
    a second threshold detector responsive to an stack terminal voltage across the second set of solid polymer electrochemical fuel cells;
    a second transistor coupled for activation via the second threshold detector; and
    a second dump load, wherein the second transistor is responsive to the stack terminal voltage across the second set of fuel cells to selectively couple the second dump load in parallel with the second set of solid polymer electrochemical fuel cells when the stack terminal voltage across the second set of fuel cells exceeds a threshold voltage and to uncouple the second dump load when the stack terminal voltage across the second set of solid polymer electrochemical fuel cells is below the threshold voltage.

3. The fuel cell stack assembly of claim 1 wherein the dump load is positioned upstream from the solid polymer electrochemical fuel cells in an air flow for providing heat to the solid polymer electrochemical fuel cells.

4. The fuel cell stack assembly of claim 1 wherein the dump load is positioned proximate the solid polymer electrochemical fuel cells for providing heat thereto.

5. The fuel cell stack assembly of claim 1, further comprising:
    a capacitance electrically coupled across the dump load.

6. The fuel cell stack assembly of claim 1, further comprising:
    an inductance electrically coupled in series between the first set of solid polymer electrochemical fuel cells and the dump load.

7. The fuel cell stack assembly of claim 1 wherein the first transistor is an n-channel field effect transistor.

8. The fuel cell stack assembly of claim 1 wherein the first transistor is a p-channel field effect transistor.

9. The fuel cell stack assembly of claim 1 wherein the first transistor is one of an n-channel bipolar junction transistor and a p-channel bipolar junction transistor.

* * * * *